Feb. 9, 1965 W. B. HARRINGTON 3,169,208
SEQUENCE SPARK GAP SYSTEM WITH PERFORATED GAP ELECTRODES
Filed June 12, 1962 3 Sheets-Sheet 3

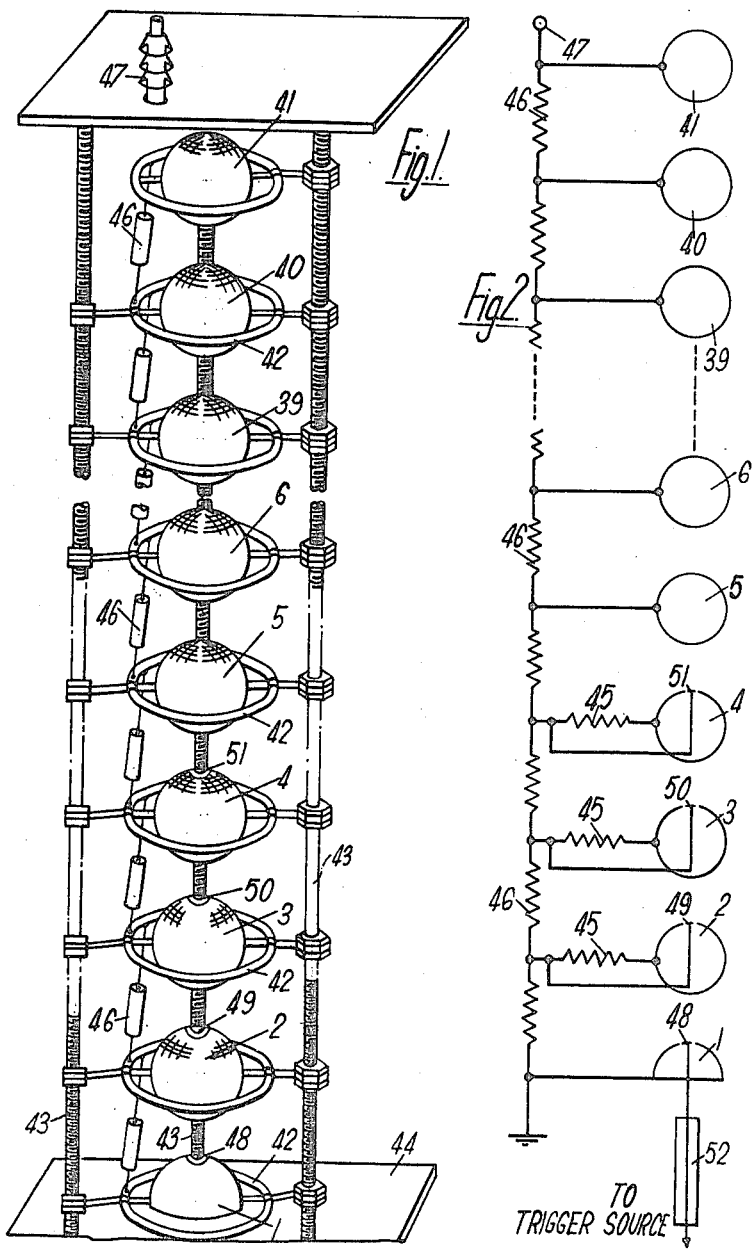

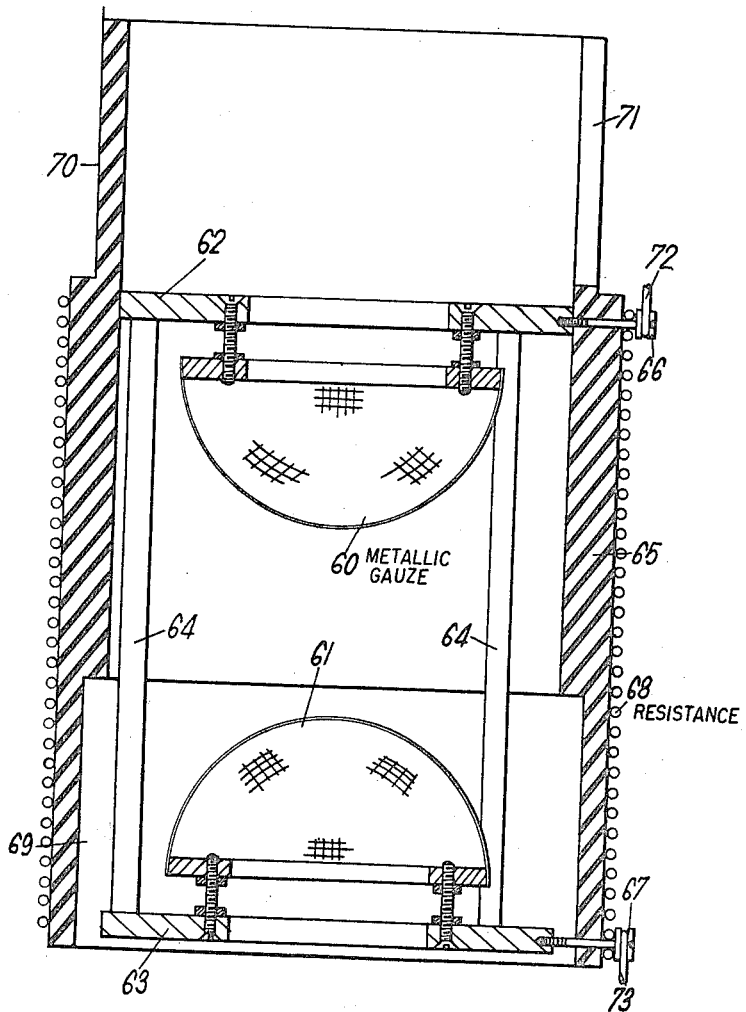

INVENTOR
W. B. HARRINGTON
BY
Cameron, Kerkam & Sutton
ATTORNEYS

United States Patent Office 3,169,208
Patented Feb. 9, 1965

3,169,208
SEQUENCE SPARK GAP SYSTEM WITH PERFORATED GAP ELECTRODES
William Barrett Harrington, Grotton, Oldham, England, assignor to Ferranti, Limited, Hollinwood, Lancashire, England, a company of Great Britain and Northern Ireland
Filed June 12, 1962, Ser. No. 201,926
Claims priority, application Great Britain, June 22, 1961, 22,546/61
10 Claims. (Cl. 315—36)

This invention relates to controlled high voltage chopping means.

Controlled high voltage chopping means are used to apply chopped-wave tests to the windings of transformers. For these tests to be successful it is necessary for the applied voltage wave to be chopped within plus or minus one tenth of a microsecond of the required time from the start of the voltage wave. For voltages up to 500,000 volts this requirement is satisfied by the use of a controlled sphere gap, often known as a triggatron, but for higher voltages the sphere gap suffers from serious disadvantages. Firstly, the size becomes prohibitive in view of the very large spheres required, such spheres being very difficult and expensive to manufacture. Secondly, at higher voltages the range of the gap becomes very small, i.e. for any given gap setting the difference between the minimum voltage at which the gap may be satisfactorily triggered and the voltage at which the gap will fire without being triggered, becomes very small and the operation of the gap becomes increasingly uncertain.

It is an object of the present invention to provide a controlled high voltage chopping means which operates satisfactorily at voltages higher than 500,000 volts and which has a good range at such high voltages.

According to the present invention a high voltage controlled chopping means comprises a stack of low voltage gaps adapted to be connected across a high voltage source, and a chain of resistances for determining the voltage across each of said gaps, at least one gap at one end of the stack being a triggered gap, each of the non-triggered gaps including a portion made of perforated metal such that in operation ultra-violet radiation emitted from a fired gap may pass through to the next unfired gap to cause such gap to fire.

The expression "perforated metal" as used herein includes metallic gauze as well as metal drilled with a plurality of holes.

The spacing of said gaps may be progressively increased from the triggered end of said stack.

Each of said gaps may be a sphere gap and said gaps may be formed of metallic gauze.

Figure 4:
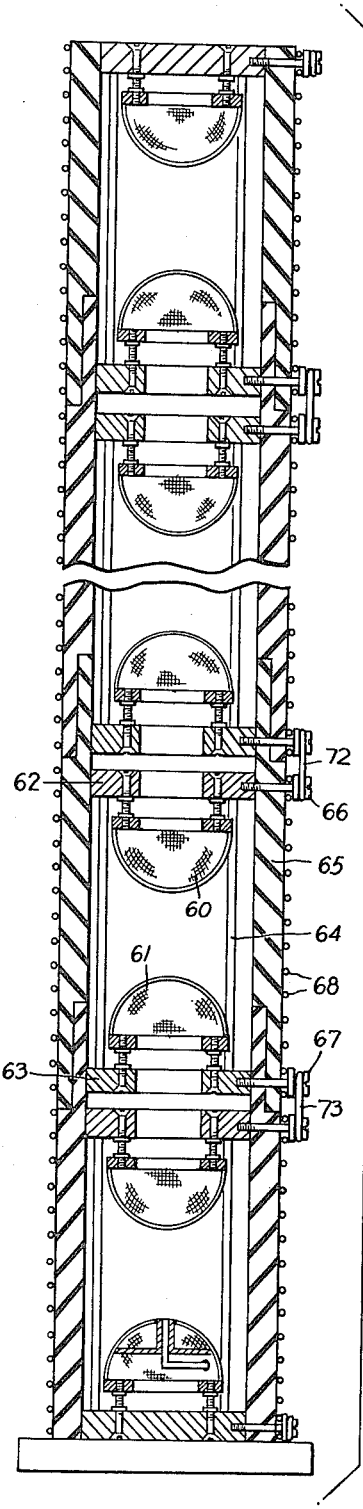
Figure 5:
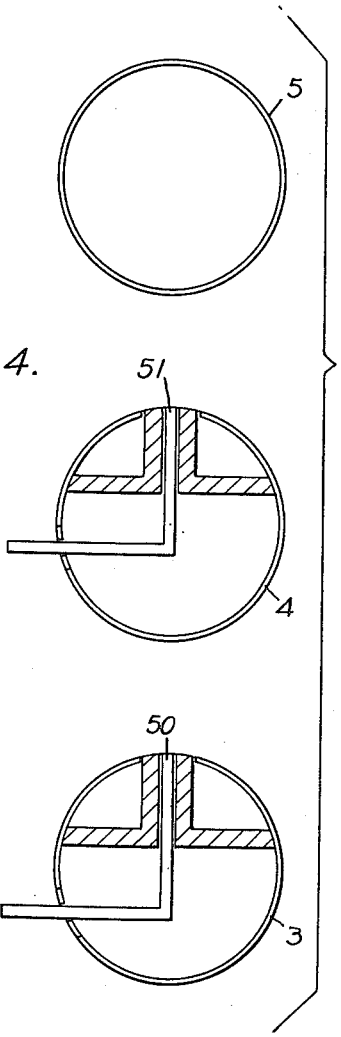

One embodiment of the present invention will now be described by way of example with reference to the accompanying drawings in which:

FIGURE 1 is a perspective view of one form of controlled high voltage chopping means in accordance with the invention, FIGURE 2 is a circuit diagram showing the electrical connections of the chopping means shown in FIGURE 1, FIGURE 3 is a sectional elevation of one section of a further form of high voltage chopping means in accordance with the invention, FIGURE 4 is a sectional elevation of a stacked arrangement of spark gap units of the character illustrated in FIGURE 3, embodying hemispherical electrodes supported within insulated housings forming a tube of electrically non-conductive material, and FIGURE 5 is an enlarged view illustrating the basic physical structure of the gap and trigger electrodes shown in FIGURES 1 and 2.

Referring now to FIGURES 1 and 2 of the drawings the chopping means shown is suitable for chopping a voltage wave of 2,000,000 volts and includes a stack of forty low voltage gaps formed by a hemisphere 1 and forty spheres 2 . . . 41 of which only seven are shown in the drawings. The spheres 2 . . . 41 are made of metallic gauze and are supported within copper rings 42 which in turn are adjustably supported from three threaded support rods 43 of electrically non-conductive material mounted on a base 44. The hemisphere 1 is made of sheet metal and is similarly supported within a copper ring 42 adjustably supported from the rods 43.

The hemisphere 1 and the spheres 5 . . . 41 are electrically connected to the respective copper rings 42 surrounding them and the spheres 2, 3 and 4 are connected to the copper rings 42 via resistors 45 (not shown in FIGURE 1). Forty resistors 46 of equal value are connected between the copper rings 42 to form a chain of equalising resistances, the copper ring at the top of the stack being connected to a high tension terminal 47 and the copper ring at the bottom of the stack being connected to earth potential. The hemisphere 1 and the spheres 2, 3 and 4 are provided with trigger electrodes 48, 49, 50 and 51 in well known manner, as indicated in FIGURE 5. The trigger electrode 48 is connected via a delay line 52 to the high voltage generator and the trigger electrodes 49, 50 and 51 are connected directly to the respective copper rings 42 supporting the spheres 2, 3 and 4. Any voltage generated across the resistors 45 is therefore applied across the triggering gaps in the spheres 2, 3 and 4 as may be clearly seen from FIGURE 2.

In operation a triggering pulse is applied to the delay line 52 at the start of the high voltage wave, the delay line 52 having a delay time equal to the required delay between the start of the high voltage wave and the operation of the chopping means. The chopping means is connected in parallel with the transformer winding under test and the high voltage is therefore applied across the chopping means. The resistors 46 equalise the voltage across each gap and in the present example for an applied voltage of 2,000,000 volts a voltage of 50,000 volts is applied across each gap, the spacing of the gaps being such that this voltage is insufficient to cause the gap to fire.

At the desired chopping time the triggering pulse is applied to the trigger electrode 48 causing the first gap to fire. The bottom resistor 46 is therefore shorted out and a voltage pulse is developed across the bottom resistor 45 which is applied to the trigger electrode 49 causing the second gap to fire. The third and fourth gaps are caused to fire in a similar manner by triggering pulses developed across the resistors 45 and applied to the trigger electrodes 50 and 51. The fifth gap has no trigger electrode but when the fourth gap has fired the full voltage is applied across thirty-six gaps instead of forty and the voltage across each gap is therefore 55,555 volts. This additional voltage, however, is insufficient to cause the fifth gap to fire, but ultra-violet radiation from the fired fourth gap passes through the gauze of the sphere 5 and causes ionisation of the air in the fifth gap. This ionisation lowers the voltage required to cause the gap to fire and the applied voltage becomes sufficient and causes the gap to fire. Ultra-violet radiation omitted by the fired fifth gap then passes through the gauze of sphere 6 to cause the sixth gap to fire, the remainder of the gaps being successively fired in a similar manner by ultra-violet radiation from a fired gap passing through the gauze sphere to the next unfired gap and causing ionisation of the air in the gap.

The firing of the gaps in the manner just described is extremely rapid and the firing may be controlled within the desired limit of plus or minus one tenth of a microsecond from the required time from the start of the voltage wave. Furthermore, the range of the chopping means just described remains substantially constant and does not appreciably decrease for an increase in the applied voltage.

Referring now to FIGURE 3 of the drawings there is shown one section of a further form of controlled chopping means in accordance with the invention in which each gap is formed by two hemispheres 60 and 61 of metallic gauze adjustably mounted on metallic annular support plates 62 and 63 separated by rods 64 of insulating material. Each gap so formed is supported within a tube 65 of insulating mtaerial by means of screws 66, 67 passing through the wall of the tube 65 and screwing into the support plates 62 and 63 respectively. A resistance 68 formed by resistance wire wound on the outer surface of the tube 65 is connected across the gap by means of the screws 66 and 67.

The tube 65 is provided at one end with a portion 69 of increased internal diameter and is provided at the other end with a portion 70 of reduced external diameter. The chopping means is formed, as indicated in FIGURE 4 by assembling as many gaps as are required by fitting the portions 69 of each section over the porton 70 of the adjacent section, each portion 70 being provided with a slot 71 to accommodate the screw 67. Adjacent sections are electrically connected together by metallic straps such as 72 and 73 clamped by the screws 66 and 67. The gaps at the lower end of the stack are provided with trigger electrodes in the manner described above with reference to FIGURES 1 and 2, only one such trigger electrode being shown in FIGURE 4.

In operation the chopping means is fired in the same manner as described above with reference to FIGURES 1 and 2, ultra-violet radiation passing from a fired to an unfired gap through the gauze hemispheres. This form of chopping means, however, has the advantage that it is readily dismantled when not in use or for transport and, furthermore, the chopping means may be adapted for any required voltage simply by assembling the required number of gaps.

The chopping means described above may be varied in many ways. For example, the triggered spheres 2, 3 and 4 in FIGURE 1 have been described as made of metallic gauze but they may be made of sheet metal since it is not necessary for ultra-violet radiation to pass through these spheres. Furthermore each sphere need not be made wholly of gauze or perforated metal but only need be perforated to such an extent that ultra-violet radiation may pass through the spheres from a fired gap. Also, the gaps need not be sphere gaps, as described. They may, for example, be uniform field gaps. It is sometimes found advantageous to grade the gaps such that in operation the field strength between successive gaps is gradually decreased from the triggered end of the stack. This may be done by grading the resistors 46 in FIGURE 1 or the resistances 68 in FIGURE 3, but is more conveniently done by progressively increasing the spacing of the spheres. The number of gaps in the stack may be varied according to the applied voltage and the number of triggered gaps at the triggered end of the stack may also be varied.

What we claim is:

1. A sequence spark gap device comprising a stack of series connected spark gaps each having a pair of electrodes, said stack of spark gaps being adapted to be connected across a high voltage source with the electrodes of said spark gaps arranged in a single line, at least one spark gap at one end of said stack being provided with a trigger electrode, the electrodes of each of said spark gaps not provided with a trigger electrode including a portion made of perforated metal to provide a path for ultra-violet radiation between each such spark gap and the preceding spark gap, and a plurality of series connected resistances connected across said stack of series connected spark gaps for determining the voltage across each of said spark gaps.

2. A sequence spark gap system as claimed in claim 1 in which each of said electrodes is at least partially spherical.

3. A sequence spark gap system as claimed in claim 1 in which at least some of said electrodes are formed of metallic gauze.

4. A sequence spark gap system as claimed in claim 1 in which the spacing of said electrodes is progressively increased from the triggered end of said stack.

5. A sequence spark gap system as claimed in claim 1 in which each of said pairs of electrodes forming a gap is mounted within a tube of electrically non-conductive material.

6. A sequence spark gap system as claimed in claim 5 in which each resistance of said series connected resistances is formed by resistance wire wound on the external surface of said tube.

7. A sequence spark gap system comprising a stack of series connected spark gaps each having a pair of electrodes, said stack of spark gaps being adapted to be connected across a high voltage source with the electrodes of said spark gaps serially arranged, at least one spark gap at one end of said stack being provided with a trigger electrode adapted to be connected to a source of triggering potential for firing said last named spark gap and initiating the successive firing of said other spark gaps, the electrodes of each of said spark gaps not provided with a trigger electrode including a portion made of perforated metal to provide a path for ultra-violet radiation between each such spark gap and the preceding spark gap, and a resistance voltage divider connected across said stack of series connected spark gaps for determining the voltage across each of said spark gaps.

8. A sequence spark gap system comprising a plurality of spark gaps adapted to be series connected across a high voltage source, at least one of said spark gaps at one end of said stack being provided with a trigger electrode, means for connecting said trigger electrode to a source of triggering potential, each of said spark gaps not provided with a trigger electrode having two spaced hemispherical electrodes each including a portion made of a perforated metallic material to provide a path for ultar-violet radiation between each such spark gap and the preceding spark gap, each of said spark gaps being supported within an electrically non-conductive housing having a resistance element wound thereabout, said resistance elements being arranged for series connection across said high voltage source and individual connection across the spark gap within the associated housing for determining the voltage across each of said spark gaps, and means interconnecting said housings to form a stacked array of said spark gaps.

9. A spark gap apparatus comprising a plurality of spark gap units adapted to be series connected across a high voltage source, each of said units comprising a pair of spaced hemispherical electrodes formed of perforated metal, means for adjustably mounting each pair of said electrodes within an electrically non-conductive housing, a resistance element wound about each of said housings and arranged to be electrically connected across the corresponding spark gap, and means for interconnecting said housings and serially connecting said spark gaps and their resistances to form a stacked array of said units capable of being readily assembled and dismantled.

10. A spark gap apparatus as set forth in claim 9 wherein each of said non-conductive housings comprises a tube having an increased internal diameter at one end and a reduced external diameter at its other end, said reduced external diameter of said other end being arranged to mate with the increased external diameter of said one end of an adjacent housing to form said stacked array of spark gap units.

References Cited by the Examiner
UNITED STATES PATENTS

| | | | |
|---|---|---|---|
| 2,298,114 | 10/42 | Estorff | 315—59 |
| 2,495,154 | 1/50 | Zimmerman | 315—36 |
| 2,659,839 | 11/53 | Gardner | 315—189 X |
| 2,818,527 | 12/57 | Pearson | 315—189 |

DAVID J. GALVIN, *Primary Examiner.*

ARTHUR GAUSS, DAVID J. GALVIN, *Examiners.*